United States Patent [19]

Dole et al.

[11] Patent Number: 5,124,072
[45] Date of Patent: Jun. 23, 1992

[54] ALKALINE EARTH HAFNATE PHOSPHOR WITH CERIUM LUMINESCENCE

[75] Inventors: Stephen L. Dole, Burnt Hills; Subramaniam Venkataramani, Clifton Park, both of N.Y.

[73] Assignee: General Electric Company, Schenectady, N.Y.

[21] Appl. No.: 801,559

[22] Filed: Dec. 2, 1991

[51] Int. Cl.$^5$ .............................. C09K 11/67
[52] U.S. Cl. .............................. 252/301.4 F
[58] Field of Search .................. 252/301.4 F

[56] References Cited

U.S. PATENT DOCUMENTS

| | | | |
|---|---|---|---|
| 4,230,510 | 10/1980 | Cusano et al. | 250/484.1 |
| 4,295,989 | 10/1981 | Klein et al. | 252/301.4 F |
| 4,362,946 | 12/1982 | Cusano et al. | 250/483.1 |
| 4,421,671 | 12/1983 | Cusano et al. | 252/301.4 F |
| 5,008,034 | 4/1991 | Bryan et al. | 252/301.4 F |

FOREIGN PATENT DOCUMENTS

| | | | |
|---|---|---|---|
| 78292 | 12/1970 | Fed. Rep. of Germany | 252/301.4 F |
| 641212 | 8/1950 | United Kingdom | 252/301.4 F |

OTHER PUBLICATIONS

Chanewaye et al "C.R. Acad. Sc. Paris" t.271 (1970) pp. 486-489.
Hoefdraad "J. Inorg. Nucl. Chem.", vol. 37 (1975) pp. 1917-1921.
Solov'eva et al "Izv. Akad. Nauk SSSR, Neorg. Mater." 1974, 10(8), pp. 1549-1550.

*Primary Examiner*—Jack Cooper
*Attorney, Agent, or Firm*—James E. McGinness; James C. Davis, Jr.; James Magee, Jr.

[57] ABSTRACT

A phosphor comprising an effective amount of cerium to provide luminescence, and the balance substantially an oxide compound of hafnium and an alkaline earth from the group consisting of barium, strontium, calcium, and mixtures thereof, having substantially a perovskite crystal form.

2 Claims, No Drawings

ALKALINE EARTH HAFNATE PHOSPHOR WITH CERIUM LUMINESCENCE

BACKGROUND OF THE INVENTION

This invention relates to a cerium activated radiation, and nuclear radiation detecting applications. More specifically, the invention relates to an alkaline earth and hafnium oxide phosphor having cerium luminescence.

Computerized tomography scanners are diagnostic instruments used in industrial and medical imaging. A body is exposed to a relatively planar beam or beams of radiation, such as x-ray or gamma ray radiation, the intensity of which varies in direct relationship to the energy absorption along a plurality of body paths. By measuring the radiation intensity along these paths from a plurality of different angles or views, a radiation absorption coefficient can be computed for various areas in any plane of the body through which the radiation passes. The absorption coefficients are used to produce a display of, for example, bodily organs intersected by the radiation.

Phosphors can be used to form scintillators which are excited by the impinging X-ray or gamma radiation, and emit optical wave length radiation. The optical output from the scintillator material is made to impinge upon photo electrically responsive materials in order to produce electrical output signals. The amplitude of the signals is directly related to the intensity of the impinging X-ray or gamma radiation. The electrical signals are digitized for processing by digital computer means which generate the absorption coefficients in a form suitable for display on a cathode ray tube screen or other permanent media.

In general, it is desirable that the amount of light output from the phosphors and resulting scintillator be as large as possible for a given amount of X-ray or gamma ray energy. This is particularly true in the medical tomography area where it is desired that the energy intensity of the X-ray be as small as possible to minimize any danger to the patient.

Another important property that the phosphor material should possess is that of short afterglow, persistence, or decay time constant. As used herein, the term "decay time constant" means the time for luminescence output to decay to about 36.8 percent of the maximum light output after the excitation radiation ceases. This means that there should be a relatively short period of time between the termination of the high energy radiation excitation and the cessation of light output from the phosphor or scintillator. If this is not the case, there is a blurring, in time, of the information bearing signal generated, for example, when the scintillator is used to produce tomographic imaging data. Furthermore, if rapid tomographic scanning is desired, the presence of the afterglow tends to severely limit the scan rate, thereby rendering difficult the view of moving bodily organs, such as the heart or lungs.

Positron emission tomography scanners utilize gamma ray detector systems. The detector system is capable of capturing gamma rays and converting them into a luminescent output. The luminescent output is converted by means of a photo multiplier into an electrical signal. Bismuth germanate has the necessary high stopping power required for capturing gamma radiation, and has been used in gamma ray detection systems. The gamma ray stopping power of bismuth germanate has been measured to be about 0.955 per centimeter. The decay time constant for bismuth germanate is about 300 nanoseconds.

It is an object of this invention to provide a phosphor comprised of cerium in an oxide compound of hafnium and an alkaline earth from the group barium, strontium, calcium, or mixtures thereof.

It is another object of this invention to provide a phosphor having a high gamma ray stopping power, e.g., comparable to bismuth germanate.

It is another object of this invention to provide a phosphor having a high gamma ray stopping power, and a fast decay time constant, e.g., less than the 300 nanosecond decay time constant for bismuth germanate.

BRIEF DESCRIPTION OF THE INVENTION

The phosphors of this invention are comprised of, an effective amount of cerium to provide luminescence, and the balance substantially an oxide compound of hafnium and alkaline earth from the group consisting of barium, strontium, calcium, and mixtures thereof having substantially a perovskite crystal form. The phosphors have a high stopping power, while the cerium provides luminescence with a high light output and a rapid decay of emitted light after luminescing. As used herein, the term "balance substantially an oxide compound," means the remainder of the composition is the oxide compound, however other compounds may be present up to an amount that does not substantially impair the light emitting properties of the phosphor. For example, compounds of cerium and hafnium or cerium and the alkaline earth may be present up to about 5 volume percent.

The perovskite crystal form is substantially cubic, occurring as rounded cubes modified by the octahedral and dodecahedral forms.

DETAILED DESCRIPTION OF THE INVENTION

The phosphors of this invention may be used in a wide variety of applications as cathodoluminescent or photoluminescent emitters. For example, the phosphors can be distributed in the scintillator structures disclosed in U.S. Pat. Nos. 4,362,946 and 4,230,510, incorporated herein by reference. Such scintillator structures provide optical coupling of luminescence from the phosphor distributed in the scintillator to photoelectrically responsive devices.

The phosphor of this invention is comprised of cerium in an effective amount to provide luminescence, preferably about 0.01 to 10 mole percent, and most preferably about 0.1 to 1 mole percent of the oxide compound. The phosphor is formed from an oxide compound of alkaline earth and hafnium. The oxide compound has the formula $AHfO_3$, where A is an alkaline earth from the group barium, strontium, calcium, and mixtures thereof. Although the formula for the oxide compound shows an atomic ratio of hafnium to alkaline earth of about 1:1, the ratio may vary by about plus or minus 5 mole percent. Such oxide compounds have a substantially perovskite crystal form. In otherwords, hafnium and alkaline earth can be present in the phosphors of this invention in the ratios that provide the oxide compound of hafnium and alkaline earth having substantially a perovskite crystal form. The oxide compound of hafnium and alkaline earth having the perovskite crystal form is sometimes herein referred to as the "alkaline earth hafnate" compound.

The phosphors can be formed by conventional methods well known in the art for forming oxide phosphor powders, for example disclosed in U.S. Pat. No. 4,424,671, incorporated herein by reference. Briefly described, the constituent hafnium and alkaline earth in the ratio that forms the alkaline earth hafnate compound, and cerium oxides, or oxosalts such as oxalates, carbonates, hydroxides, and nitrates that decompose to form the oxides, are mixed to a uniform distribution. The mixing can be carried out in an agate mortar and pestle or in a ball mill using water, heptane, or an alcohol such as ethyl alcohol as a liquid vehicle. Suitable milling media that are non-contaminating to the phosphor, i.e. reduce the light emitting properties, are zirconia or Teflon synthetic resin polymers. Dry milling may also be used for both mixing and breakup of powder aggregates. If dry milling is employed, a grinding aid such as 1 to 5 weight percent of stearic acid or oleic acid should be employed to prevent powder packing or sticking inside the ball mill.

If the mixture is formed from the oxo-salts such as the nitrates, carbonates, hydroxides, or oxalates, a calcining step is required to obtain the corresponding oxides. The oxo-salts can be calcined in an oxidizing atmosphere such as air at about 700° to 1000° C. The oxide mixture is heat treated in an inert atmosphere such as nitrogen, helium, hydrogen, air, or a vacuum to form the alkaline earth hafnate compound. The alkaline earth hafnate compound can be formed by heating to about 1200° to 1300° C., and holding for about 1 hour. The heat treatments to calcine and form the alkaline earth hafnate compound can be performed in a single heating step by heating to about 1200° to 1300° C. in the inert atmosphere.

The compound is heated in a reducing atmosphere at about 1500° to 2000° C., and held for about 1 hour to provide the cerium luminescence. A suitable reducing atmosphere reduces the oxidation state of the cerium. For example, suitable reducing atmospheres are comprised of 10 percent hydrogen and the balance nitrogen, or dry nitrogen. A suitable reducing atmosphere has an oxygen partial pressure of about $10^{-5}$ atmospheres or less. Alkaline earth hafnate compounds comprised of calcium or strontium can be formed in air, but are improved by forming in the reducing atmosphere.

EXAMPLES

Phosphor powders were formed by mixing oxides of hafnium and alkaline earth in the ratio to form the alkaline earth hafnate compounds, and about 1 mole percent cerium to form 25 gram quantities. The mixtures were heated to 1250° C. in air for about 4 hours to form the alkaline earth hafnate compounds. The compounds were heat treated at 1600° C. for about 1 hour in an atmosphere comprised of about 90 percent nitrogen and 10 percent hydrogen to provide the cerium luminescence.

The powders were inspected by X-ray diffraction and found to have a substantially perovskite crystal form. The light emission of the powders was measured by UV spectrophotometer, and the gamma ray stopping power was determined by calculation from the attenuation coefficient of the constituent elements. The decay time constant of light emitted from the phosphor powders after excitation by radiation was measured by the delayed coincidence method as disclosed for example in "Measurement of the Time Dependence of Scintillator Intensity by a Delayed Coincidence Method," L. M. Bollinger and C. E. Thomas, Review Scientific Instruments, vol. 32, 1961, pp. 1044-1050, incorporated herein by reference. The results of the light emission, and decay time constant tests are shown below in Table I. The gamma ray stopping power and decay time constant of a conventional bismuth germanate powder is shown for comparison.

TABLE I

| Composition | Peak of Light Emission (nanometers) | Range of Light Emission (nanometers) | Gamma Ray Stopping Power(cm$^{-1}$) | Decay Time Constant (nanoseconds) |
|---|---|---|---|---|
| $Ba_{0.99}Ce_{0.01}HfO_3$ | 400 | 350–500 | 0.918 | |
| $Sr_{0.99}Ce_{0.01}HfO_3$ | 400 | 350–500 | 0.841 | 20–25 |
| $Ca_{0.99}Ce_{0.01}HfO_3$ | 430 | 370–530 | 0.797 | 20–25 |
| Bismuth Germanate | | | 0.955 | 300 |

A visual comparison of the light output of the alkaline earth hafnate powders was made with bismuth germanate, and the light output of the alkaline earth hafnate powders was observed to be comparable to or better than the bismuth germanate.

Referring to Table I, the alkaline earth hafnate compound phosphors of this invention having cerium luminescence provide a comparable gamma radiation stopping power to bismuth germanate, with a decay time constant of emitted light that is about an order of magnitude less. In summary, it has been observed that the alkaline earth hafnate powders provide comparable light output and gamma ray stopping power as compared to bismuth germanate, while providing a decay time constant of the emitted light that is about ten times faster than bismuth germanate.

What is claimed is:

1. An alkaline earth hafnate phosphor with cerium luminescence having substantially a perovskite crystal form comprising
   about 0.01 to 10 mole percent cerium, and the balance substantially an oxide having the formula $AHfO_3$, where A is an alkaline earth from the group consisting of barium, strontium, calcium, and mixtures thereof, wherein the ratio of Hf:A is about 1:095 to 1.05, and exhibiting a decay time constant that is about an order of magnitude less than 300 nanoseconds.

2. A phosphor according to claim 1 wherein the cerium is about 0.1 to 1 mole percent.

* * * * *